(12) United States Patent
Ulaganathan et al.

(10) Patent No.: US 10,689,110 B2
(45) Date of Patent: Jun. 23, 2020

(54) METHOD AND SYSTEM FOR PERFORMING INSPECTION AND MAINTENANCE TASKS OF THREE-DIMENSIONAL STRUCTURES USING DRONES

(71) Applicant: Wipro Limited, Bangalore (IN)

(72) Inventors: Sethuraman Ulaganathan, Tamil Nadu (IN); Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 289 days.

(21) Appl. No.: 15/936,784

(22) Filed: Mar. 27, 2018

(65) Prior Publication Data

US 2019/0248485 A1 Aug. 15, 2019

(30) Foreign Application Priority Data

Feb. 12, 2018 (IN) .............................. 201841005274

(51) Int. Cl.
*B64C 39/02* (2006.01)
*G05D 1/10* (2006.01)
(Continued)

(52) U.S. Cl.
CPC ......... *B64C 39/024* (2013.01); *G05D 1/0088* (2013.01); *G05D 1/101* (2013.01);
(Continued)

(58) Field of Classification Search
CPC ............ B64C 39/024; B64C 2201/141; B64C 2201/127; B64C 2201/12; G06T 19/006;
(Continued)

(56) References Cited

U.S. PATENT DOCUMENTS

| 8,825,454 B2 * | 9/2014 | Pershing ............ G06K 9/00637 703/1 |
| 2014/0002472 A1 | 1/2014 | Sobeski et al. |

(Continued)

OTHER PUBLICATIONS

Szoldra, P., "This Drone Can Paint Your House Better Than You Can", http://www.businessinsider.com/apellix-drone-can-paint-homes-and-de-ice-airplanes-2016.

*Primary Examiner* — Mary Cheung
(74) *Attorney, Agent, or Firm* — Finnegan, Henderson, Farabow, Garrett & Dunner, LLP (57) ABSTRACT

This disclosure relates generally to drones, and more particularly to method and system for performing inspection and maintenance tasks of three-dimensional structures (3D) using drones. In one embodiment, a method for performing a task with respect to a 3D structure is disclosed. The method includes receiving a simulated 3D view of the 3D structure. The simulated 3D view comprises a hierarchy of augmented views to different degrees. The method further includes configuring one or more paths for performing a task on the 3D structure based on the hierarchy of augmented views, historical data on substantially similar tasks, and a capability of the at least one drone. The method further includes learning maneuverability and operations with respect to the one or more paths and the task based on the historical data on substantially similar tasks, and effecting performance of the task based on the learning through the at least one drone.

23 Claims, 5 Drawing Sheets

```
                          ┌─ 300
                          ▼
┌─────────────────────────────────────────────────────┐
│ RECEIVE A SIMULATED THREE-DIMENSIONAL VIEW OF A     │
│ THREE-DIMENSIONAL STRUCTURE, WHEREIN THE SIMULATED  │
│ THREE-DIMENSIONAL VIEW COMPRISES A HIERARCHY OF     │
│ AUGMENTED VIEWS TO DIFFERENT DEGREES 301            │
└─────────────────────────────────────────────────────┘
                          ▼
┌─────────────────────────────────────────────────────┐
│ CONFIGURE ONE OR MORE PATHS FOR PERFORMING A TASK   │
│ ON THE THREE-DIMENSIONAL STRUCTURE BASED ON THE     │
│ HIERARCHY OF AUGMENTED VIEWS, HISTORICAL DATA ON    │
│ SUBSTANTIALLY SIMILAR TASKS, AND A CAPABILITY OF    │
│ THE AT LEAST ONE DRONE 302                          │
└─────────────────────────────────────────────────────┘
                          ▼
┌─────────────────────────────────────────────────────┐
│ LEARN MANEUVERABILITY AND OPERATIONS WITH RESPECT   │
│ TO THE ONE OR MORE PATHS AND THE TASK BASED ON THE  │
│ HISTORICAL DATA ON SUBSTANTIALLY SIMILAR TASKS 303  │
└─────────────────────────────────────────────────────┘
                          ▼
┌─────────────────────────────────────────────────────┐
│ EFFECT PERFORMANCE OF THE TASK BASED ON THE         │
│ LEARNING THROUGH THE AT LEAST ONE DRONE 304         │
└─────────────────────────────────────────────────────┘
```

(51) Int. Cl.
*G05D 1/00* (2006.01)
*G06T 19/00* (2011.01)

(52) U.S. Cl.
CPC ...... *G06T 19/006* (2013.01); *B64C 2201/127* (2013.01); *B64C 2201/141* (2013.01); *G06T 2200/24* (2013.01)

(58) Field of Classification Search
CPC .. G06T 2200/24; G05D 1/0088; G05D 1/101; G05D 1/0094; G05D 1/104
See application file for complete search history.

(56) References Cited

U.S. PATENT DOCUMENTS

| | | |
|---|---|---|
| 2015/0274294 A1 | 10/2015 | Dahlstrom |
| 2016/0093223 A1* | 3/2016 | Caudron ................ B64D 45/00 701/3 |
| 2017/0018113 A1* | 1/2017 | Lattanzi ................ G06T 15/205 |
| 2017/0121019 A1 | 5/2017 | Shin et al. |
| 2017/0190104 A1 | 7/2017 | Bostick et al. |
| 2017/0210470 A1 | 7/2017 | Pardell |
| 2017/0355457 A1* | 12/2017 | Terry ................... G08G 5/0034 |
| 2018/0026708 A1* | 1/2018 | Priest ................... G08G 5/0026 370/316 |
| 2018/0342100 A1* | 11/2018 | Mollis .................... G06T 7/248 |

* cited by examiner

METHOD AND SYSTEM FOR PERFORMING INSPECTION AND MAINTENANCE TASKS OF THREE-DIMENSIONAL STRUCTURES USING DRONES

This application claims the benefit of Indian Patent Application Serial No. 201841005274 filed Feb. 12, 2018, which is hereby incorporated by reference in its entirety.

FIELD

This disclosure relates generally to drones, and more particularly to method and system for performing inspection and maintenance tasks of three-dimensional structures using drones.

BACKGROUND

Unmanned aerial vehicles or drones are increasingly employed for performing various tasks such as surveillance, search and rescue operations, surveying and mapping, delivering cargo, aerial photography, and so forth. One such area, where drones may be effectively utilized, is inspection and maintenance of complex three-dimensional (3D) structures (e.g., building, factories, machinery, etc.). As will be appreciated, a 3D structure may have many obscure portions, which make it tedious and time consuming for a human to perform a task with precision. In contrast, agile and compact drones may easily access and perform various tasks in such obscure portions of the 3D structure.

However, existing techniques are limited in their ability and usefulness. For example, existing techniques for performing a task (e.g., painting) require a user to remotely maneuver the drone to the designated area and cause it to perform the desired task. Thus, each time a task is to be performed, the user has to provide detailed instruction to the aerial operation system. Further, existing techniques are not capable of learning context from their daily operations. In short, existing techniques do not provide for an autonomous performance of a task in an improvised manner by learning from its own performance in real-time.

SUMMARY

In one embodiment, a method for performing a task with respect to a three-dimensional (3D) structure is disclosed. In one example, the method may include receiving a simulated 3D view of the 3D structure. The simulated 3D view comprises a hierarchy of augmented views to different degrees. The method may further include configuring one or more paths for performing a task on the 3D structure based on the hierarchy of augmented views, historical data on substantially similar tasks, and a capability of the at least one drone. The method may further include learning maneuverability and operations with respect to the one or more paths and the task based on the historical data on substantially similar tasks. The method may further include effecting performance of the task based on the learning through the at least one drone.

In one embodiment, a system for performing a task with respect to a 3D structure is disclosed. In one example, the system may include at least one processor and a memory communicatively coupled to the at least one processor. The memory may store processor-executable instructions, which, on execution, may cause the processor to receive a simulated 3D view of the 3D structure. The simulated 3D view comprises a hierarchy of augmented views to different degrees. The processor-executable instructions, on execution, may further cause the processor to configure one or more paths for performing a task on the 3D structure based on the hierarchy of augmented views, historical data on substantially similar tasks, and a capability of the at least one drone. The processor-executable instructions, on execution, may further cause the processor to learn maneuverability and operations with respect to the one or more paths and the task based on the historical data on substantially similar tasks. The processor-executable instructions, on execution, may further cause the processor to effect performance of the task based on the learning through the at least one drone.

In one embodiment, a non-transitory computer-readable medium storing computer-executable instructions for performing a task with respect to a 3D structure is disclosed. In one example, the stored instructions, when executed by a processor, may cause the processor to perform operations including receiving a simulated 3D view of the 3D structure. The simulated 3D view comprises a hierarchy of augmented views to different degrees. The operations may further include configuring one or more paths for performing a task on the 3D structure based on the hierarchy of augmented views, historical data on substantially similar tasks, and a capability of the at least one drone. The operations may further include learning maneuverability and operations with respect to the one or more paths and the task based on the historical data on substantially similar tasks. The operations may further include effecting performance of the task based on the learning through the at least one drone.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
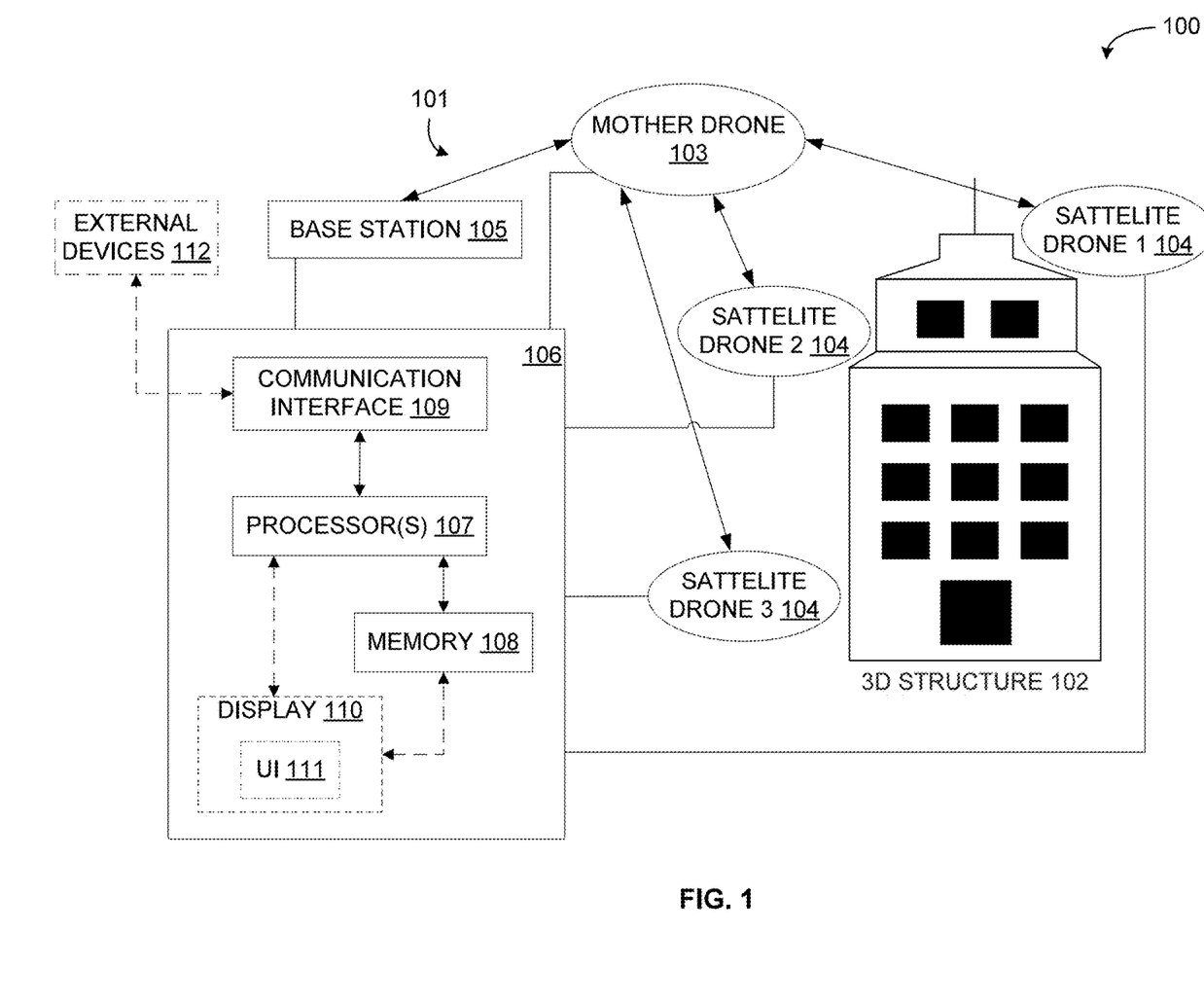
FIG. 1 is a block diagram of an exemplary system for performing a task with respect to a three-dimensional (3D) structure in accordance with some embodiments of the present disclosure.

Referring now to FIG. 1, an exemplary system 100 for performing a task with respect to a three-dimensional (3D) structure 102 is illustrated in accordance with some embodiments of the present disclosure. In particular, the system 100 may include a drone subsystem 101 to perform various task with respect to the 3D structure 102. The task may include, but is not limited to, inspection and maintenance task, manufacturing task, task related to civil infrastructure, and task related to disaster management. In some embodiments, the drone subsystem 101 may be utilized to perform inspection of the 3D structure 102, to understand various features of the 3D structure 102, and to perform maintenance of the 3D structure 102. For example, if the 3D structure 102 is a building, then the drones may be utilized to perform painting by inspecting existing painting and understanding features of the existing painting (e.g., color of existing paint, shade of the existing paint, surface on which the existing paint is applied, existing paint applied on surrounding area, etc.). Similarly, if the 3D structure 102 is an industrial machinery, then the drones may be utilized to perform inspection and maintenance of the industrial machinery.

As will be described in greater detail in conjunction with FIGS. 2-4, the drone subsystem 101 may receive a simulated 3D view of the 3D structure 102. The simulated 3D view may include a hierarchy of augmented views to different degrees. The drone subsystem 101 may further configure one or more paths for performing a task on the 3D structure 102 based on the hierarchy of augmented views, historical data on substantially similar tasks, and a capability of the at least one drone. The drone subsystem 101 may further learn maneuverability and operations with respect to the one or more paths and the task based on the historical data on substantially similar tasks, and effect performance of the task based on the learning through the at least one drone. Thus, the drone subsystem 101 may be capable of automatically planning and executing a task (e.g., inspection, maintenance, etc.) by continuously learning from the performance of the previous planning and execution of similar tasks.

The drone subsystem 101 may include one or more drones in communication with a base station 105. It should be noted that the one or more drones may communicate with the base station 105 either directly or through an intermediary drone. For example, in some embodiments, the one or more drones may include a mother drone 103 and a number of satellite drones 104. The mother drone 103 may be in communication with the base station 105, while the satellite drones 104 may be in communication with the mother drone 103. Thus, the satellite drones 104 may be indirectly (i.e. through the mother drone 103) in communication with the base station 105. As will be appreciated by those skilled in the art, each of the components 103-105 of the drone subsystem 101 may be a processor based computing device 106. For example, the base station 105 may include, but is not limited to, a server, a desktop computer, a laptop, a notebook, a netbook, and a personal computing device (e.g., a tablet computer, a smartphone, etc.).

The computing device 106 may include one or more processors 107, a computer-readable medium (e.g., a memory) 108, and a communication interface 109. The computer-readable storage medium 108 may store instructions that, when executed by the one or more processors 107, cause the one or more processors 107 to perform various operations in accordance with aspects of the present disclosure. The computer-readable storage medium 102 may also store various data (e.g., captured images of 3D structure, simulated 3D view of 3D structure, one or more configured or learnt paths, maneuverability commands, operational commands, contextual information, performance information, historical data on past tasks, information on each drone, contextual conversation, etc.) that may be captured, processed, and/or required by the system 100. The communication interface 109 may enable communication among the components 103-105 over a wired or a wireless communication channel(s).

In some components (e.g., the base station 105), the computing device 106 may also include a display 110. The computing device 106 may, therefore, interact with a user via a user interface 111 accessible via the display 110. Additionally, in some components (e.g., the base station 105), the computing device 106 may interact with one or more external devices 112 over a wired or a wireless communication channel(s), through the communication interface 109, for sending or receiving various data, such as characteristics or features of the 3D structure 102, learning of the drone subsystem 101, and so forth. The external devices 105 may include, but are not limited to, a remote server, another computing device, or a peripheral device.

Figure 2:
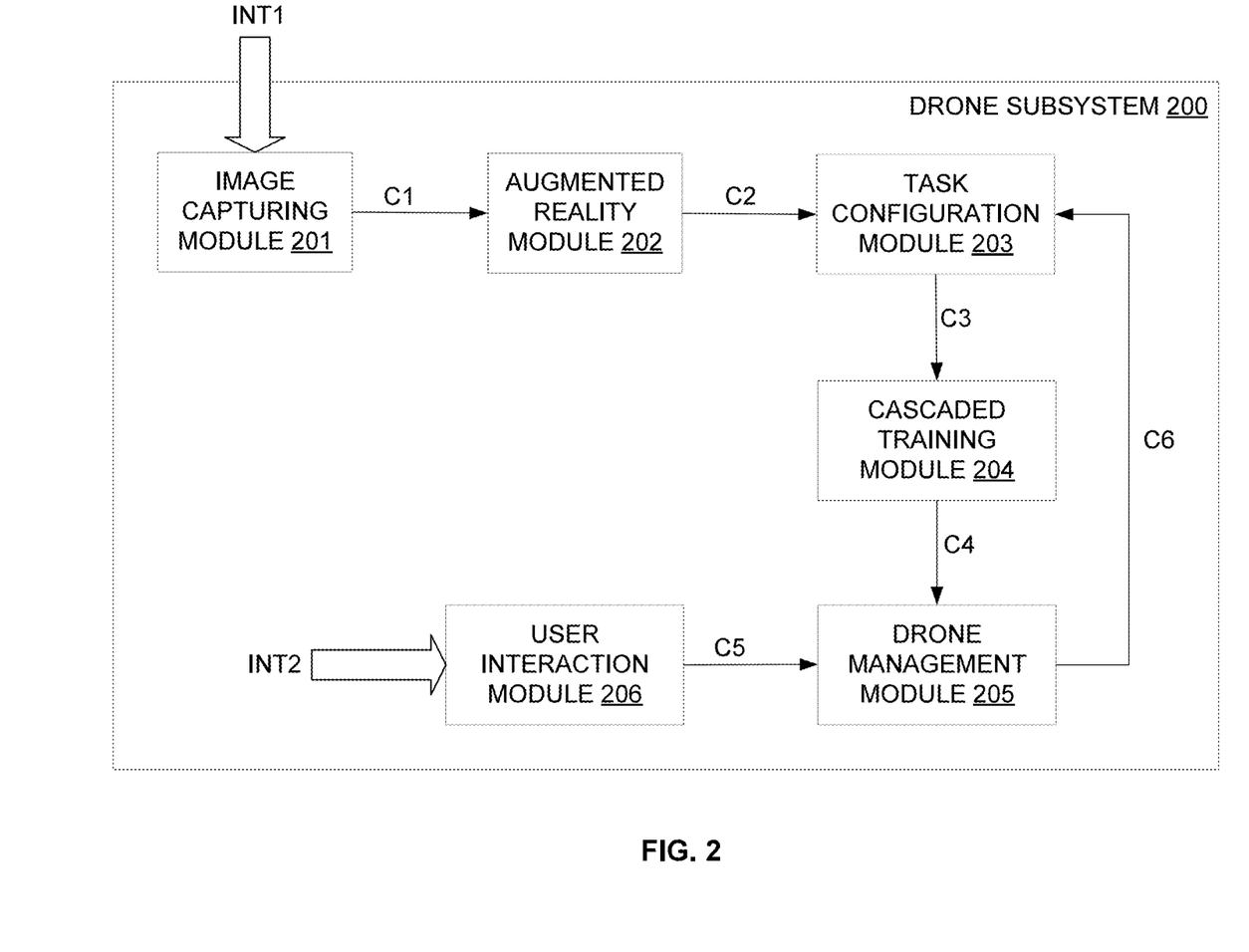
FIG. 2 is a functional block diagram of a drone subsystem in accordance with some embodiments of the present disclosure.

Referring now to FIG. 2, a functional block diagram of a drone subsystem 200, analogous to the drone subsystem 101 of FIG. 1, is illustrated in accordance with some embodiments of the present disclosure. The drone subsystem 200 may include various modules that perform various functions so as to perform various tasks on the 3D structure. In some embodiments, the drone subsystem 200 may include an image capturing module 201, an augmented reality module 202, a task configuration module 203, a cascaded training module 204, a drone management module 205, and a user interaction module 206. As will be appreciated by those skilled in the art, all such aforementioned modules 201-206 may be represented as a single module or a combination of different modules. Moreover, as will be appreciated by those skilled in the art, each of the modules 201-206 may reside, in whole or in parts, on one device or multiple devices in communication with each other. For example, each of the modules 201-206 may reside, in whole or in parts, on any of the mother drone 103, the satellite drones 104, and/or the base station 105.

The image capturing module 201 may capture a plurality of images of the 3D structure from different angles through one or more of the drones employed by the drone subsystem 200. In particular, the image capturing module 201 may instruct some or all of the image capturing drones to capture images of the 3D structure from different angles. As will be appreciated, the image capturing drones may include an imaging device (e.g., camera, light detection and ranging (LIDAR) scanner, ultrasonic imaging device, infrared imaging device, etc.) so as to capture the images. The image capturing module 201 may then receive the captured images from the image capturing drones via an interface INT1.

The augmented reality module 202 may receive the captured images from the image capturing module 201 via a connection C1. The augmented reality module 202 may then simulate the 3D structure in an augmented reality system using the captured images. In some embodiments, the augmented reality system may provide for an interactive interface to display a hierarchy of augmented views to different degrees through which a user can provide inputs. For example, the augmented reality system may selectively make the objects appear or disappear based on the user input via the interactive interface.

The task configuration module 203 may receive the simulated 3D structure along with the user inputs from the augmented reality module 202 via a connection C2. The task configuration module 203 may then automatically configure one or more paths for performing the task based on the user inputs on the simulated 3D structure. The task configuration module 203 may also employ historical data on similar tasks performed by the drone subsystem 200 to automatically configure the one or more paths for performing the task. In some embodiments, the task configuration module 203 may configure the paths by learning a number of paths for the task to be performed using the simulated 3D structure, a historical data of similar tasks performed or configured by the drone subsystem 200, and the efficiency of the drones employed by the drone subsystem 200. For example, one or more paths for a current task may be configured based on the various probable paths and the availability of the drones.

The cascaded training module 204 may receive the one or more configured paths for performing the task from the task configuration module 203 via a connection C3. The cascaded training module 204 may then train the drones regarding the configured paths for performing the task. In some embodiments, the cascaded training module 204 may train the mother drone regarding the configured paths. It should be noted that, the training may include, but is not limited to, the control instructions regarding the configured paths, maneuvers, operations, etc. In some embodiments, the training may be through reinforced learning based on historical data on substantially similar tasks as well as based on ongoing data on current task. In other words, the training may be based on what the drone subsystem 200 has learnt from past performance of similar tasks and from contextual information with respect to performance of ongoing task.

The drone management module 205 may receive training completion information from the cascade training module 204 via a connection C4. The drone management module 205 may then effect the performance of the task based on the training (i.e., learning). As will be appreciated, the drone management module 205 may instruct the drones to perform the task based on the training. In some embodiments, the drone management module 205 may instruct the mother drone to execute the task based on the training. The mother drone may then control the satellite drones for executing the task. Additionally, the drone management module 205 may be capable of receiving user inputs from the user interaction module 206 via a connection C5. The drone management module 205 may, therefore, dynamically control the drones based on the user inputs.

Further, once the trained drones (e.g., mother drone and satellite drones) start performing the task, the drone management module 205 may store the contextual and performance information (e.g., image context) about the task being performed. As will be appreciated, the task may include a number of steps or sub-tasks to be executed in an ordered sequence. In other words, the steps or sub-tasks may be a sequence of operations to be performed to complete the task. The drone management module 205 may, therefore, employ the contextual and performance information stored in the previous steps of the task (i.e., image context of previous sub-tasks) to dynamically instruct the actions to appropriate drone (e.g., a particular satellite drone) for performance of subsequent steps of the task (i.e., performance of subsequent sub-tasks). In some embodiments, drone management module 205 may employ the contextual and performance information about the drone stored in the previous steps to dynamically instruct the actions to appropriate drone based on the weighted sum of accessibility, proximity, available battery power, and availability of the drone. Moreover, the drone management module 205 may provide the stored contextual and performance information with respect to the current task to the task configuration module 203 via a connection C6 for future training.

The user interaction module 206 may facilitate user interaction with the drone subsystem 200 while performing the task by way of contextual conversation. Thus, the user may directly provide instructions to the drones through the contextual conversation via an interface INT2. As stated above, the instructions received from the user may then be provided to the drone management module 205 via the connection C5.

As will be appreciated, the interface INT1 may transfer images from the image capturing drones to the image capturing module 201 by employing communication protocols over standard wired or wireless data connections means. For example, the interface INT1 may employ one or more connection protocols including, but not limited to, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), long-term evolution (LTE), and WiMax. Similarly, the interface INT2 may acquire data from the user using a microphone or any other standard input device. Further, as will be appreciated, each of the connections, C1-C6, may transfer data from one module 201-206 to the other module 201-206 using standard wired or wireless data connections means. For example, each of the connections, C1-C6, may employ one or more connection protocols including, but not limited to, RS-232, RS-422, RS-485, I2C, SPI, Microwire, 1-Wire, IEEE 1284, Intel® QuickPathInterconnect, InfiniBand, and PCIe.

It should be noted that the at least some of the components of the drone subsystem 200 may be implemented in programmable hardware devices such as programmable gate arrays, programmable array logic, programmable logic devices, and so forth. Alternatively, such components of the drone subsystem 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

By way of an example, a dry run is performed before performance of a specific task. As will be appreciated, based on the task to be performed, the characteristics or features captured by the image capturing module 201 during the dry run may change. For example, when the drone subsystem 200 is to be deployed for painting task, close up images of the surface may be captured so as to identify variations in existing paint. Further, a color to be applied on a particular portion may be decided. If the color to be applied on the surface may be different from the existing color, then a standard calibration may be performed. An accelerometer or a gyroscope may be used to locate coordinates. However, if same color is to be applied, then the amount of spray at different coordinates (x, y, z) may require a change and the same may be decided. Further, a velocity of spray, nozzle volume, and distance from surface may be decided. In some embodiments, deep learning techniques may be employed for mapping old color wall to new one. Similarly, when the drone subsystem 200 is to be deployed for inspecting a machinery, the characteristics or features captured by the image capturing module 201 during the dry run may be different. The drone subsystem 200 may use special controlling software and data from sensors such as accelerometers, barometers, gyroscopes, and GPS. These data may be subsequently used for planning and execution of the task.

The augmented reality module 202 may then simulate the 3D structure using the captured images. As will be appreciated, the augmented reality (AR) may be used to identify and understand various characteristics and features of the 3D structure, such as, uniform and non-uniform (existing) colors, weathered and non-weathered colors, and so forth. For example, the user may change the color intensities at different portions of the 3D structure during AR viewing, and see how a certain portion looks with the changes under different lighting conditions (e.g., night, cloudy day, when faded, when added, moon light. different lights in night). Such interactive view, therefore, may help the user choose from multiple paint light combinations. As will be appreciated, prediction of color changes, uneven distributions, etc. may be performed through a convolutional neural network (CNN). In some embodiments, the user may identify a certain portion (e.g., by putting a circle) and converse by referring to that portion (e.g. 'put more paint in this portion').

The augmented reality module 202 may further provide a hierarchy of augmented views to different degrees by selectively making the objects appear or disappear based on user choice. For example, when focused on the building from outside, the living room may appear augmented over the building. Further, when the user selects a cupboard, the open cupboard augments on top of the closed one which is augmented over the building. Thus, different objects may be augmented to different degrees and rendered in a view. In some embodiments, objects or parts that undergo similar service may be rendered in one view. For example, for painting primer task, wall inside and outside of the cupboard may be displayed simultaneously along with exterior walls of the building. Such rendering may help the drone subsystem 200 to service them together with a common time frame. Further, such related views may be stored as one image view and tagged with a name or a code by the system or the user. As will be appreciated, collation of similar task may be performed after inspection. Moreover, in some embodiments live videos from the drones may be augmented. A determination may then be made with respect to inspection (e.g., if an inspection is required) at some point based on a plurality of factors such as accessibility of the drones, accessibility of area to be inspected, need for the area to be inspected, requirement of number of the drones for completing the inspection, etc. It should be noted that the regions in images where hierarchies exist behind, may be hyperlinked (similar to hyperlinked text) and shown with different color or box. Such rendering of different views of the 3D structure may help the drone subsystem 200 as well as the user in better interpretation and understanding of the 3D structure while planning and executing the task.

The task configuration module 203 may then configure one or more paths for performing the task based on user inputs with respect to the simulated 3D structure, historical data on similar tasks performed, and the efficiency of the drones. The cascaded training module 204 may further train the one or more drones to learn the configured path to maneuver. As stated above, in some embodiments, the one or more drones may include the mother drone and a number of satellite drones. Thus, the cascaded training module 204 may train the mother drone to learn the configured path to maneuver. As stated above, the training may include the historical data of the drone subsystem 200 performing similar tasks.

The drone management module 205 may then effect performance of the task through the mother drone based on the training. In particular, the drone management module 205 may instruct the mother drone to perform the task based on the training. The mother drone may further train and assign the tasks to the satellite drones based on the received training. For example, if there is a possibility of painting behind obscuring obstacles, the mother drone may instruct the satellite drone to move behind the obscuring obstacles and acquire images. Further, if further obstacles are present behind the obscuring obstacles, the mother drone may instruct the satellite drone to inspect by hovering behind the further obstacles. The mother drone may also instruct the satellite drone to stop if the further obstacle is too small or if inspection is not possible, or to call second order satellite drones. Thus, the mother drone may train the satellite drones according to the requirement of the task or the requirement of the satellite drones to complete the task.

Further, the drone management module 205 may implement a mechanism to store and retrieve the experience. The previous experience associated with a task or a sub-task may be stored along with the image context. For example, the drone management module 205 may store information that, last time, while painting the corner, the drone spent more time to achieve required color. The drone management module 205 may accordingly ensure a drone with higher available battery power for the sub-task. Similarly, if there were lumps of paint left behind in the previous execution of task, then the drone management module 205 may ensure that, in the current task to be performed, either nozzle diameter is to be reduced or painting time is to be reduced. As will be appreciated, the mechanism to store and retrieve experience may be imported from the experience in other sites (e.g., other buildings, other machinery, etc.).

Moreover, in some embodiments, the user may convey the instructions to the drones through conversation via the user interaction module 206. For example, the user may instruct the drones to get more details of specific parts during inspection, to check if there is a crack, to take the images from certain angles, to zoom particular parts, and so forth. The user interaction module 206 may understand user requirements through natural language processing of user instructions, video snapshot (with scene and text, voice, or action), and the image context stored in the earlier steps of the task. The user interaction module 206 may then convey the actions to appropriate satellite drone based on the weighted sum of accessibility (e.g., compactness, size, etc.), proximity (e.g., nearness to the target region), battery power (e.g., operational range), and availability (e.g., if drone is free or in the middle of something).

In one exemplary implementation to perform painting task, the drone (e.g., mother drone) may be pre-loaded with 3D data of the structure (e.g., building) along with the predefined painting details. It should be noted that the 3D data may be previously built by the drone subsystems 200. Additionally, the drone may be loaded or supplied with different colors of paints as per the predefined painting design selected by the user from the base station. The drone may fly in and around the 3D structure in an unmanned manner, and allow or control the spray painting unit to paint with higher precision as per the pre-loaded painting design. The drone may then automatically paint different colors, control the paint spraying speed, and so forth according to the 3D dynamics of the structure. The drone may return to the base station once the painting task completed, or battery down, or the paint is over. As will be appreciated, the drone may wisely avoid the obstacles based on the preloaded 3D data of the structure. Additionally, the drone may intelligently avoid any unexpected obstacles that it may encounter. Moreover, in some embodiments, the drone may be tethered with painting tanks and/or power batteries via an umbilical cord so that it does not need to replace their batteries or painting tanks. It should be noted that such tethered arrangement also enables the drone to save on the battery and time by avoiding trips to the base station when the battery power falls.

In some embodiments, the drone may be coupled with a number of sub-drones (e.g., satellite drones) that are smaller in size. The sub-drones may enable the drone subsystem 200 to efficiently handle tiny dynamics of the 3D structure. As discussed above, in some embodiments, the sub-drones may be controlled by the mother drone. For example, the sub-drones may be ejected by the mother drone based on the real-time requirements and decisions. In some embodiments, the sub-drones or satellite drones may be connected with umbilical cords to supply power or paint from the mother drone. It should be noted that not all sub-drones may be tethered to the mother drone. Thus, some sub-drones may not be physically connected to the mother drone via the umbilical cords and may work independently to capture or inspect very tiny dynamics of the 3D structure. Further, it should be noted that the sub-drones may work simultaneously, independent of or in collaboration with each other, and in other such fashion to ensure efficient execution of the task.

As will be appreciated by one skilled in the art, a variety of processes may be employed for performing a task with respect to a 3D structure. For example, the exemplary system 100 and the associated drone subsystem 200 may perform the task with respect to the 3D structure by the processes discussed herein. In particular, as will be appreciated by those of ordinary skill in the art, control logic and/or automated routines for performing the techniques and steps described herein may be implemented by the system 100 and the associated drone subsystem 200, either by hardware, software, or combinations of hardware and software. For example, suitable code may be accessed and executed by the one or more processors on the system 100 or the drone subsystem 200 to perform some or all of the techniques described herein. Similarly application specific integrated circuits (ASICs) configured to perform some or all of the processes described herein may be included in the one or more processors on the system 100 or the drone subsystem 200.

Figure 3:
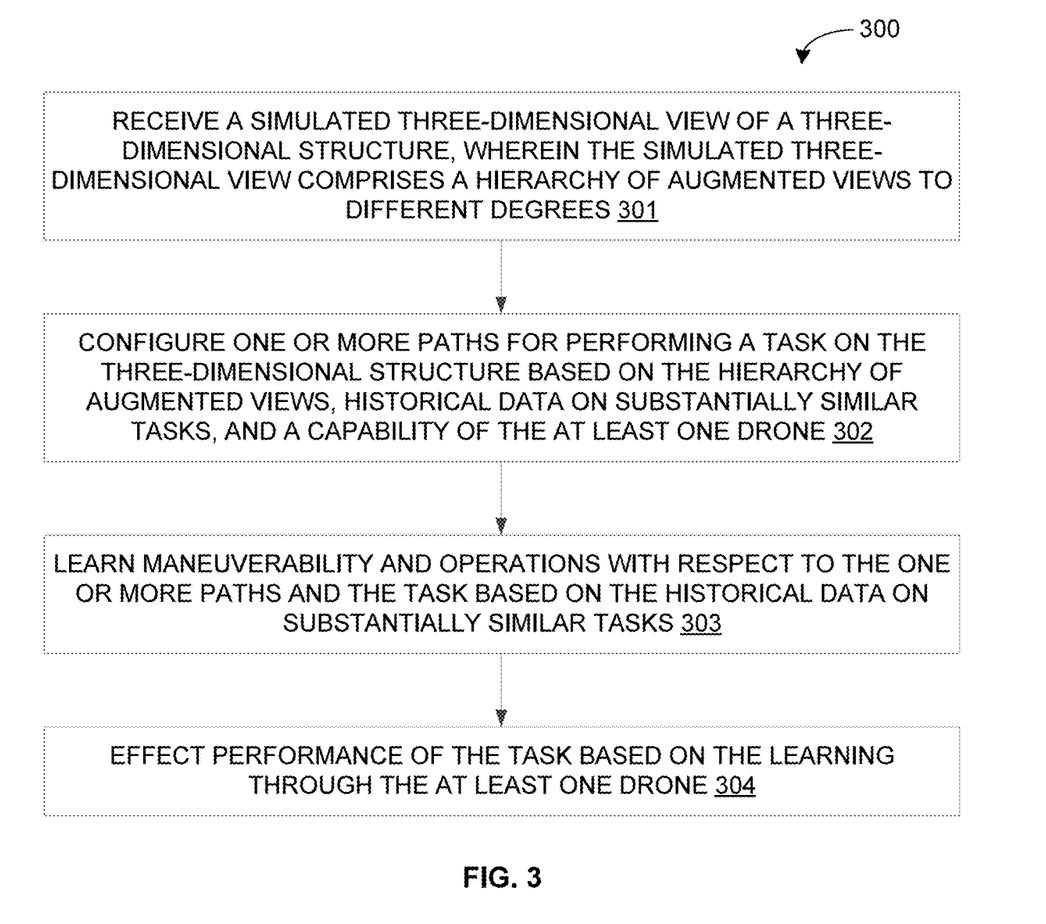
FIG. 3 is a flow diagram of an exemplary process for performing a task with respect to a 3D structure in accordance with some embodiments of the present disclosure.

For example, referring now to FIG. 3, exemplary control logic 300 for performing a task with respect to a 3D structure via a system, such as system 100, is depicted via a flowchart in accordance with some embodiments of the present disclosure. As illustrated in the flowchart, the control logic 300 may include the step of receiving a simulated 3D view of the 3D structure at step 301. The simulated 3D view comprises a hierarchy of augmented views to different degrees. The control logic 300 may further include the steps of configuring one or more paths for performing the task based on the hierarchy of augmented views, historical data on substantially similar tasks, and a capability of the at least one drone at step 302, learning maneuverability and operations with respect to the one or more paths and the task based on the historical data on substantially similar tasks at step 303, and effecting performance of the task based on the learning through at least one drone at step 304. It should be noted that, in some embodiments, the at least one drone may include a mother drone and at least one child drone. Further, it should be noted that the term "child drone", "sub-drone", and "satellite drone" may be used interchangeably throughout the document.

In some embodiments, the control logic 300 may further include the steps of receiving a plurality of images of the 3D structure from a plurality of views, and simulating the 3D structure based on the plurality of images using an augmented reality to generate the hierarchy of augmented views to different degrees. Additionally, in some embodiments, the control logic 300 may include the step of capturing the plurality of images of the 3D structure from the plurality of views. Further, in some embodiments, the control logic 300 may include the step of displaying the hierarchy of augmented views to different degrees using an interactive interface to a user. It should be noted that displaying may include selectively making one or more objects appear or disappear based on inputs from the user. Moreover, in some embodiments, the control logic 300 may include the step of enabling an interaction between the drone subsystem and a user while performing the task by way of contextual conversation.

In some embodiments, the task may include at least one of an inspection, or a maintenance of the 3D structure. It should be noted that the maintenance may include at least one of a painting, cleaning, repairing, or replacement of at least a part or a component of the 3D structure. Additionally, in some embodiments, the historical data may include at least one of configured paths, maneuverability commands, operational commands, or contextual information from at least one of previous planning or previous execution of the substantially similar tasks. Further, in some embodiments, the capability of the at least one drone may include an available battery power of the at least one drone, an availability of the at least one drone, an accessibility of the target region for the at least one drone, or a proximity of the at least one drone to the target region.

In some embodiments, configuring the one or more paths at step 302 may include the step of learning a plurality of paths for the task to be performed based on the hierarchy of augmented views, historical data on substantially similar tasks performed or configured, and capability of the at least one drone. Additionally, in some embodiments, learning the maneuverability and the operations at step 303 may include the step of learning at least one of control instructions with respect to the one or more paths, maneuvers, or operations through reinforced learning based on the historical data on substantially similar tasks. Further, in some embodiments, effecting performance of the task at step 304 may include the steps of instructing the at least one drone to perform the task based on the at least one of control instructions with respect to the one or more paths, maneuvers, or operations, and storing contextual and performance information about the task being performed by the at least one drone.

It should be noted that, in some embodiments, instructing the at least one drone may be further based on the capability of the at least one drone. Further, it should be noted that, in some embodiments, the capability may be derived based on a weighted sum of at least one of a range of the at least one drone, an availability of the at least one drone, an accessibility of the target region for the at least one drone, or a proximity of the at least one drone to the target region. In some embodiments, the control logic 300 may further include the steps of dynamically updating the learning based on the stored contextual and performance information, and dynamically applying the updated learning for the performance of the task.

Figure 4:
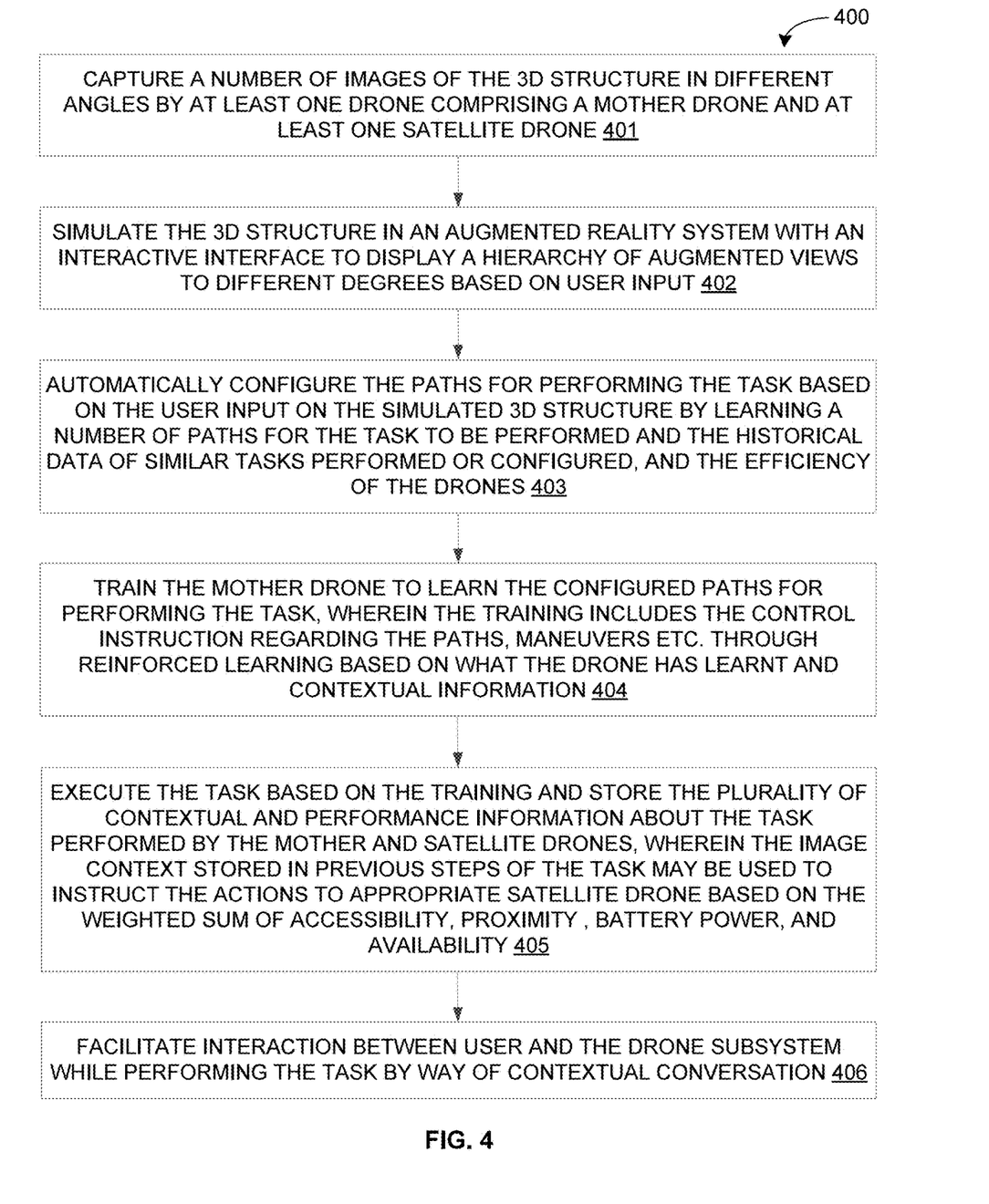
FIG. 4 is a flow diagram of a detailed exemplary process for performing a task with respect to a 3D structure in accordance with some embodiments of the present disclosure.

Referring now to FIG. 4, exemplary control logic 400 for performing a task with respect to a 3D structure is depicted in greater detail via a flowchart in accordance with some embodiments of the present disclosure. As illustrated in the flowchart, at step 401, the control logic 400 may capture a plurality of images of the 3D structure from different angles by at least one drone. The at least one drone may include a mother drone and at least one satellite drone. At step 402, the control logic 400 may simulate the 3D structure in an augmented reality system with an interactive interface to display a hierarchy of augmented views to different degrees based on user input. The augmented reality system may selectively make the objects appear or disappear based on a user choice. At step 403, the control logic 400 may automatically configure one or more paths for performing the task based on the user input on the simulated 3D structure. The control logic 400 may learn a number of probable paths for the task to be performed based on the historical data of similar tasks performed or configured, and the efficiency of the drones. The control logic 400 may then configure the one or more paths based on the various probable paths and the availability of the drones.

At step 404, the control logic 400 may train the mother drone to learn the configured paths for performing the task. The training may include the control instruction regarding the paths, maneuvers etc. through reinforced learning based on what the drone has learnt and contextual information. It should be noted that the training may employ historical data of the drone subsystem performing similar tasks. At step 405, the control logic 400 may execute the task based on the training and store the plurality of contextual and performance information about the task performed by the mother and satellite drones. As will be appreciated, the image context stored in the previous tasks or previous steps of the ongoing task (i.e., performance of previous sub-tasks of the ongoing task) may be used to instruct the actions to appropriate satellite drone, based on the weighted sum of accessibility, proximity, battery power and availability, for performance of the ongoing task or performance of subsequent steps of the ongoing task (i.e., performance of subsequent sub-tasks of the ongoing task). At step 406, the control logic 400 may facilitate interaction between the user and the drone subsystem while performing the task by way of contextual conversation. Thus, the user may convey the instructions to drone through conversation.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
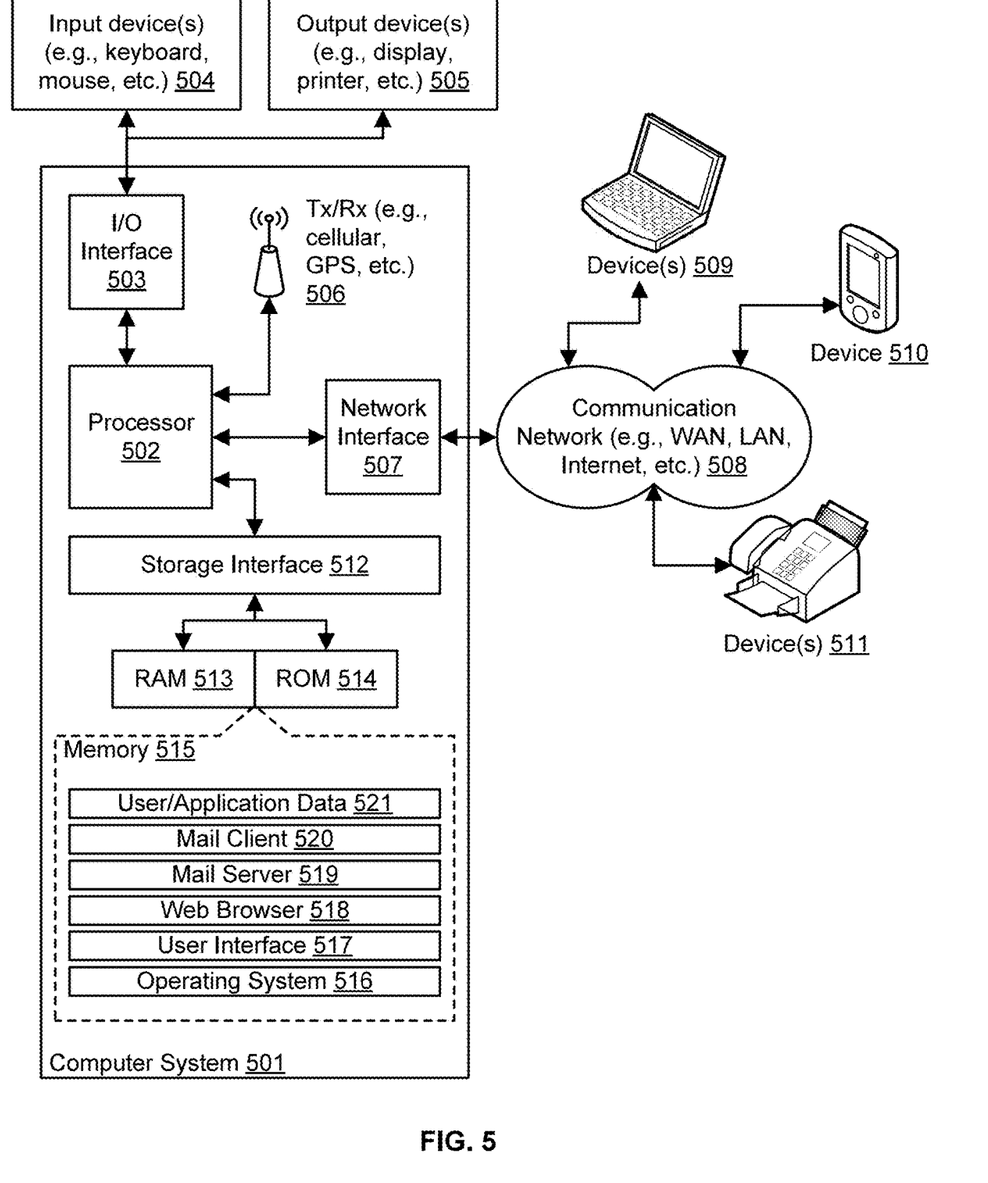
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for performing a task with respect to a 3D structure. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (B SD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., captured images of 3D structure, simulated 3D view of 3D structure, one or more configured or learnt paths, maneuverability commands, operational commands, contextual information, performance information, historical data on past tasks, information on each drone, contextual conversation, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for smart drone subsystem to understand complex 3D structures (e.g., building, machinery, etc.) and to perform planning and execution of various tasks with respect such 3D structures, with higher precision. The tasks may include, but are not limited to, inspection, maintenance, operation, repair, and replacement of parts. In particular, the techniques may employ deep learning and image processing techniques to control and perform various tasks including the spray painting part, maintenance of machinery etc. Additionally, the techniques provide for automatic planning and training of the drones about the various task to be performed. The base station may train and control the mother drone, which in turn may train and control its satellite drones. The satellite drones learning maneuvers from and controlled by the mother drone enable access to remote corners without user intervention.

Further, the techniques described in various embodiments discussed above provide for contextual learning based on the previously performed tasks. The techniques therefore accounts for preferences or fallacies of previous instant. Moreover, the techniques enable real-time chat with the user so as to provide for immediate implementation of user feedback. The augmented reality of the 3D structure (with hierarchy of augmented views) over the interactive interface further provides to the user a single view for the same action to be applied.

The specification has described method and system for performing a task with respect to a 3D structure. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing a task with respect to a three-dimensional (3D) structure, the method comprising:
   receiving, by a drone subsystem comprising at least one drone, a simulated 3D view of the 3D structure, wherein the simulated 3D view comprises a hierarchy of augmented views to different degrees;
   configuring, by the drone subsystem, one or more paths for performing the task based on the hierarchy of augmented views, historical data on substantially similar tasks, and a capability of the at least one drone;
   learning, by the drone subsystem, maneuverability and operations with respect to the one or more paths and the task based on the historical data on substantially similar tasks; and
   effecting, by the drone subsystem, performance of the task based on the learning through the at least one drone.

2. The method of claim 1, wherein the at least one drone comprises a mother drone and at least one child drone.

3. The method of claim 1, further comprising:
   receiving, by the drone subsystem, a plurality of images of the 3D structure from a plurality of views; and
   simulating, by the drone subsystem, the 3D structure based on the plurality of images using an augmented reality to generate the hierarchy of augmented views to different degrees.

4. The method of claim 3, further comprising:
   capturing, by the drone subsystem, the plurality of images of the 3D structure from the plurality of views.

5. The method of claim 3, further comprising:
   displaying the hierarchy of augmented views to different degrees using an interactive interface to a user, wherein displaying comprises selectively making one or more objects appear or disappear based on inputs from the user.

6. The method of claim 1, wherein the task comprises at least one of an inspection, or a maintenance of the 3D structure, and wherein the maintenance comprises at least one of a painting, cleaning, repairing, or replacement of at least a part or a component of the 3D structure.

7. The method of claim 1, wherein the historical data comprises at least one of configured paths, maneuverability commands, operational commands, or contextual information from at least one of previous planning or previous execution of the substantially similar tasks.

8. The method of claim 1, wherein the capability of the at least one drone comprises an available battery power of the at least one drone, an availability of the at least one drone, an accessibility of the target region for the at least one drone, or a proximity of the at least one drone to the target region.

9. The method of claim 1, wherein configuring the one or more paths comprises learning a plurality of paths for the task to be performed based on the hierarchy of augmented views, historical data on substantially similar tasks performed or configured, and capability of the at least one drone.

10. The method of claim 1, wherein learning the maneuverability and the operations comprises learning at least one of control instructions with respect to the one or more paths, maneuvers, or operations through reinforced learning based on the historical data on substantially similar tasks.

11. The method of claim 10, wherein effecting performance of the task comprises:
    instructing the at least one drone to perform the task based on the at least one of control instructions with respect to the one or more paths, maneuvers, or operations; and
    storing contextual and performance information about the task being performed by the at least one drone.

12. The method of claim 11, wherein instructing the at least one drone is further based on the capability of the at least one drone, and wherein the capability is derived based on a weighted sum of at least one of an available battery power of the at least one drone, an availability of the at least one drone, an accessibility of the target region for the at least one drone, or a proximity of the at least one drone to the target region.

13. The method of claim 11, further comprising:
    dynamically updating the learning based on the stored contextual and performance information; and
    dynamically applying the updated learning for the performance of the task.

14. The method of claim 1, further comprising:
enabling an interaction between the drone subsystem and a user while performing the task by way of contextual conversation.

15. A system for performing a task with respect to a three-dimensional (3D) structure, the system comprising:
a drone subsystem comprising at least one drone, a processor, and memory storing instructions that, when executed by the at least one processor, cause the at least one processor to:
receive a simulated 3D view of the 3D structure, wherein the simulated 3D view comprises a hierarchy of augmented views to different degrees;
configure one or more paths for performing the task based on the hierarchy of augmented views, historical data on substantially similar tasks, and a capability of the at least one drone;
learn maneuverability and operations with respect to the one or more paths and the task based on the historical data on substantially similar tasks; and
effect performance of the task based on the learning through the at least one drone.

16. The system of claim 15, wherein the instructions, when executed by the at least one processor, further cause the at least one processor to:
receive a plurality of images of the 3D structure from a plurality of views; and
simulate the 3D structure based on the plurality of images using an augmented reality to generate the hierarchy of augmented views to different degrees.

17. The system of claim 15, wherein configuring the one or more paths comprises learning a plurality of paths for the task to be performed based on the hierarchy of augmented views, historical data on substantially similar tasks performed or configured, and capability of the at least one drone.

18. The system of claim 15, wherein learning the maneuverability and the operations comprises learning at least one of control instructions with respect to the one or more paths, maneuvers, or operations through reinforced learning based on the historical data on substantially similar tasks.

19. The system of claim 18, wherein effecting performance of the task comprises:
instructing the at least one drone to perform the task based on the at least one of control instructions with respect to the one or more paths, maneuvers, or operations; and
storing contextual and performance information about the task being performed by the at least one drone.

20. The system of claim 19, wherein instructing the at least one drone is further based on the capability of the at least one drone, and wherein the capability is derived based on a weighted sum of at least one of an available battery power of the at least one drone, an availability of the at least one drone, an accessibility of the target region for the at least one drone, or a proximity of the at least one drone to the target region.

21. The system of claim 19, wherein the instructions, when executed by the at least one processor, further cause the at least one processor to:
dynamically update the learning based on the stored contextual and performance information; and
dynamically apply the updated learning for the performance of the task.

22. The system of claim 15, wherein the instructions, when executed by the at least one processor, further cause the at least one processor to:
enable an interaction between the drone subsystem and a user while performing the task by way of contextual conversation.

23. A non-transitory computer-readable medium storing computer-executable instructions for:
receiving a simulated three-dimensional (3D) view of a 3D structure, wherein the simulated 3D view comprises a hierarchy of augmented views to different degrees;
configuring one or more paths for performing a task on the 3D structure based on the hierarchy of augmented views, historical data on substantially similar tasks, and a capability of the at least one drone;
learning maneuverability and operations with respect to the one or more paths and the task based on the historical data on substantially similar tasks; and
effecting performance of the task based on the learning through the at least one drone.

* * * * *